United States Patent
Hasegawa (10) Patent No.: US 8,750,366 B2
(45) Date of Patent: Jun. 10, 2014

(54) EQUALIZATION DEVICE, EQUALIZATION METHOD, AND RECORDING MEDIUM

(75) Inventor: Hideyuki Hasegawa, Tokyo (JP)

(73) Assignee: NEC Corporation, Tokyo (JP)

( * ) Notice: Subject to any disclaimer, the term of this patent is extended or adjusted under 35 U.S.C. 154(b) by 85 days.

(21) Appl. No.: 13/395,113

(22) PCT Filed: Sep. 1, 2010

(86) PCT No.: PCT/JP2010/064889
§ 371 (c)(1),
(2), (4) Date: Mar. 8, 2012

(87) PCT Pub. No.: WO2011/030701
PCT Pub. Date: Mar. 17, 2011

(65) Prior Publication Data
US 2012/0170640 A1  Jul. 5, 2012

(30) Foreign Application Priority Data
Sep. 11, 2009  (JP) .................................. 2009-210998

(51) Int. Cl.
*H03K 5/159* (2006.01)
(52) U.S. Cl.
USPC .......................... 375/233; 375/229; 375/350
(58) Field of Classification Search
USPC .................. 375/229–236, 346–350
See application file for complete search history.

(56) References Cited

U.S. PATENT DOCUMENTS

| | | | |
|---|---|---|---|
| 2005/0184785 A1 * | 8/2005 | Shirani .......................... | 327/276 |
| 2007/0286318 A1 | 12/2007 | Imahashi et al. | |
| 2008/0069199 A1 * | 3/2008 | Chen et al. .................... | 375/233 |

FOREIGN PATENT DOCUMENTS

| | | |
|---|---|---|
| JP | 04-249912 A | 9/1992 |
| JP | 2008-017094 A | 1/2008 |

OTHER PUBLICATIONS

International Search Report in PCT/JP2010/064889 dated Nov. 16, 2010 (English Translation Thereof).
Robert Payne et al., "A 6.25 Gb/s binary adaptive DFE with first post-cursor tap cancellation for serial backplane communications", IEEE International Solid-State Circuits Conference, (ISSCC) session 3,Backplane transceivers/3.5, pp. 68-69, Feb. 2005.
Vladimir Stojanovic et al., "Adaptive Equalization and Data Recovery in a Dual-Mode (PAM2/4) Serial Link Transceiver", Symposium on VLSI Circuits, pp. 348-351, Jun. 2004.
Hideyuki Sugita, et al., "A 16Gb/S $1^{st}$—Tap FFE and 3-Tap DFE in 90nm CMOS", ISSCC 2010/Session 8/ High-Speed Wireline Transceivers / 8.4. pp. 162-164.

* cited by examiner

*Primary Examiner* — Curtis Odom
(74) *Attorney, Agent, or Firm* — McGinn Ip Law Group, PLLC

(57) ABSTRACT

An equalization device (500) includes a sample hold unit (501) that samples and holds an input signal, a multiplication unit (503) that multiplies the output signal of the sample hold unit (501) by a coefficient, a sample hold unit (502) that samples and holds the input signal at a timing delayed from the sample hold timing of the sample hold unit (501) by one symbol length, a multiplication unit (504) that multiplies the output signal of the sample hold unit (502) by a coefficient, and an addition unit (505) that adds the output signal of the multiplication unit (503) and the output signal of the multiplication unit (504) to output a sum signal.

3 Claims, 8 Drawing Sheets

EQUALIZATION DEVICE, EQUALIZATION METHOD, AND RECORDING MEDIUM

TECHNICAL FIELD

The present invention relates to an equalization device for equalizing degradation in the waveform of an input signal, an equalization method, and a recording medium.

BACKGROUND ART

In recent years, the shortage of transmission line bands is coming to the surface along with the increase in the transmission speed. A problem caused by the shortage of transmission line bands is intersymbol interference. The intersymbol interference is the interference between adjacent signals each representing a bit value "0" or "1". Since the waveform of a signal degrades due to the intersymbol interference, it is difficult to determine the bit value from the input signal on the receiver side.

A method for solving the degradation in the waveform of the input signal is waveform equalization. Waveform equalization is a technique of intentionally changing part of a signal waveform in accordance with degradation in the signal waveform caused by intersymbol interference.

One of the waveform equalization techniques is decision-feedback equalization that performs processing only on the receiver side. The decision-feedback equalization is disclosed in, for example, non-patent literature 1. In the decision-feedback equalization, a bit value represented by an input signal is determined from the waveform of the input signal. Based on the determination result, the influence of degradation in the waveform of the already received input signal is removed from the next signal input to the receiver.

Figure 15:
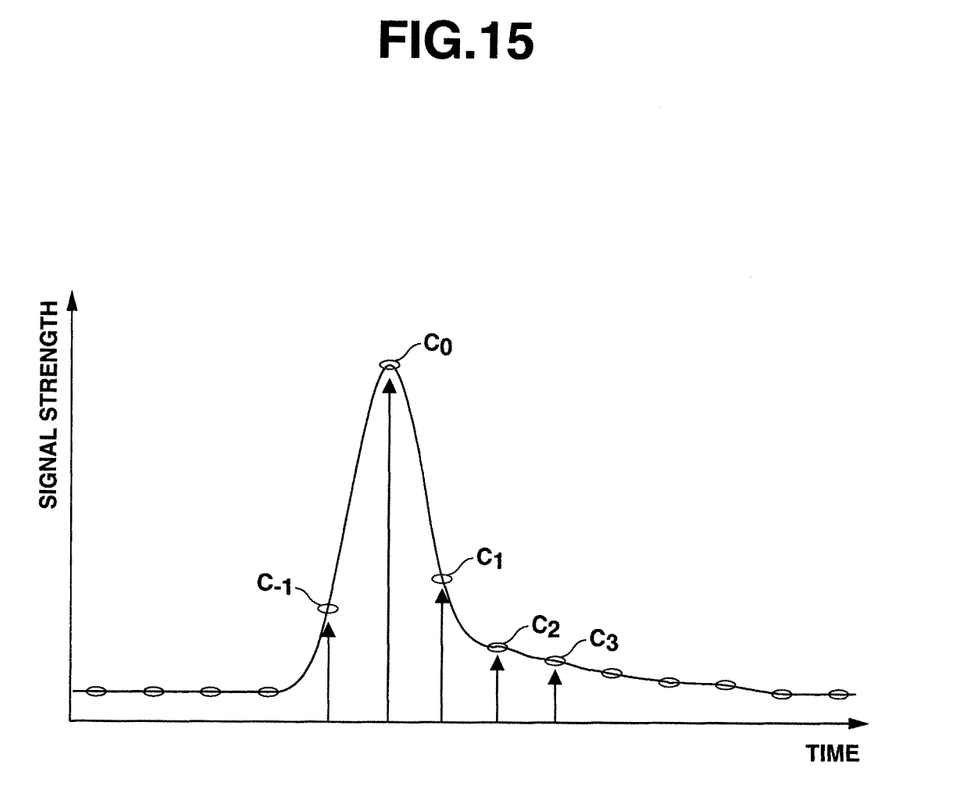
FIG. 15 is a graph showing an example of an input signal degraded by intersymbol interference.

FIG. 15 shows an example of an input signal degraded by intersymbol interference. Referring to FIG. 15, $C_0$ represents a main tap that is a bit to be determined; $C_{-1}$, a precursor that is the waveform distortion of the bit immediately before the main tap $C_0$; $C_1$, a first post-cursor that is the waveform distortion of the bit immediately after the main tap $C_0$; $C_2$, a second post-cursor; and $C_3$, a third post-cursor. In the decision-feedback equalization, the intersymbol interference from the first post-cursor $C_1$ can be removed.

In the decision-feedback equalization, the determination result is fed back. Hence, feedback to the bit next to the determined bit, that is, the first post-cursor is the fastest. The transmission rate is rate-limited by the delay time of the feedback. To avoid the rate-limitation of the transmission rate, speculative decision-feedback equalization has been proposed. The speculative decision-feedback equalization is disclosed in, for example, non-patent literature 2. In the speculative decision-feedback equalization, equalization is executed in advance for both preceding bits having values "0" and "1". After determination of the bit value, the correct execution result is selected and output. For this reason, the fastest feedback to the first post-cursor is unnecessary. This allows to increase the time constraint of feedback and achieve a higher transmission rate.

RELATED ART LITERATURE

Non-Patent Literature

Non-Patent Literature 1: Robert Payne et al., "A 6.25 Gb/s binary adaptive DFE with first post-cursor tap cancellation for serial backplane communications", IEEE International Solid-State Circuits Conference, pp. 68-69, February, 2005.

Non-Patent Literature 2: Vladimir Stojanovic et al., "Adaptive Equalization and Data Recovery in a Dual-Mode (PAM2/4) Serial Link Transceiver", Symposium on VLSI Circuits, pp. 348-351, June, 2004.

DISCLOSURE OF INVENTION

Problems to be Solved by the Invention

When the determination result is fed back after determining the bit value, as in the decision-feedback equalization disclosed in non-patent literature 1, the time constraint of feedback shortens. This is because the determination result needs to be fed back within a time corresponding to one bit, and the time necessary for determining the bit value puts a pressure on the time constraint of feedback.

To solve the problem of decision-feedback equalization, speculative decision-feedback equalization has been proposed, as disclosed in non-patent literature 2. In the speculative decision-feedback equalization, however, since equalization is speculatively executed in advance, the correct execution result needs to be selected at the succeeding stage. The delay of the selection circuit poses a problem.

The present invention has been made to solve the above-described problems, and an exemplary object of the invention is to provide an equalization device capable of speeding up equalization processing of removing intersymbol interference, an equalization method, and a recording medium.

Means of Solution to the Problems

An equalization device of an exemplary aspect of the invention includes first delay means for delaying an input signal, addition means for adding the input signal, a signal output from the first delay means, and a bit value determination result signal to generate a sum signal, and determination means for determining a bit value represented by the sum signal for each bit and feeding back the determination result signal to the addition means.

An equalization device of another exemplary aspect of the invention includes first sample hold means for sampling and holding an input signal modulated at a period of a predetermined symbol length, first multiplication means for multiplying an output signal of the first sample hold means by a first coefficient, second sample hold means for sampling and holding the input signal at a timing delayed from a sample hold timing of the first sample hold means by one symbol length of the input signal, second multiplication means for multiplying an output signal of the second sample hold means by a second coefficient, and addition means for adding an output signal of the first multiplication means and an output signal of the second multiplication means to output a sum signal.

An equalization device of still another exemplary aspect of the invention includes first sample hold means for sampling and holding an input signal modulated at a period of a predetermined symbol length, first multiplication means for multiplying an output signal of the first sample hold means by a first coefficient, second sample hold means for sampling and holding the input signal at a timing delayed from a sample hold timing of the first sample hold means by one symbol length of the input signal, second multiplication means for multiplying an output signal of the second sample hold means by a second coefficient, first addition means for adding an output signal of the first multiplication means and an output signal of the second multiplication means to output a first sum signal, third sample hold means for sampling and holding the input signal at the same timing as the sample hold timing of the first sample hold means, third multiplication means for multiplying an output signal of the third sample hold means by a third coefficient, fourth sample hold means for sampling and holding the input signal at a timing delayed from a sample hold timing of the third sample hold means by a 0.5 symbol length of the input signal, fourth multiplication means for multiplying an output signal of the fourth sample hold means by a fourth coefficient, and second addition means for adding an output signal of the third multiplication means and an output signal of the fourth multiplication means to output a second sum signal, wherein the first sample hold means, the first multiplication means, the second sample hold means, the second multiplication means, and the first addition means equalize a signal between a timing of switching of the input signal and a signal one bit before and a timing of switching of the input signal and a signal one bit after, and the third sample hold means, the third multiplication means, the fourth sample hold means, the fourth multiplication means, and the second addition means equalize a signal at the timing of switching of the input signal and the signal one bit before.

An equalization method of an exemplary aspect of the invention includes the first delay step of delaying an input signal, the addition step of adding the input signal, a signal delayed in the first delay step, and a bit value determination result signal to generate a sum signal, and the determination step of determining a bit value represented by the sum signal for each bit and feeding back the determination result signal to the addition step.

An equalization method of another exemplary aspect of the invention includes the first sample hold step of sampling and holding an input signal modulated at a period of a predetermined symbol length, the first multiplication step of multiplying an output signal obtained in the first sample hold step by a first coefficient, the second sample hold step of sampling and holding the input signal at a timing delayed from a sample hold timing of the first sample hold step by one symbol length of the input signal, the second multiplication step of multiplying an output signal obtained in the second sample hold step by a second coefficient, and the addition step of adding an output signal obtained in the first multiplication step and an output signal obtained in the second multiplication step to output a sum signal.

An equalization method of still another exemplary aspect of the invention includes the first sample hold step of sampling and holding an input signal modulated at a period of a predetermined symbol length, the first multiplication step of multiplying an output signal obtained in the first sample hold step by a first coefficient, the second sample hold step of sampling and holding the input signal at a timing delayed from a sample hold timing of the first sample hold step by one symbol length of the input signal, the second multiplication step of multiplying an output signal obtained in the second sample hold step by a second coefficient, the first addition step of adding an output signal obtained in the first multiplication step and an output signal obtained in the second multiplication step to output a first sum signal, the third sample hold step of sampling and holding the input signal at the same timing as the sample hold timing of the first sample hold step, the third multiplication step of multiplying an output signal obtained in the third sample hold step by a third coefficient, the fourth sample hold step of sampling and holding the input signal at a timing delayed from a sample hold timing of the third sample hold step by a 0.5 symbol length of the input signal, the fourth multiplication step of multiplying an output signal obtained in the fourth sample hold step by a fourth coefficient, and the second addition step of adding an output signal obtained in the third multiplication step and an output signal obtained in the fourth multiplication step to output a second sum signal, wherein in the first sample hold step, the first multiplication step, the second sample hold step, the second multiplication step, and the first addition step, a signal between a timing of switching of the input signal and a signal one bit before and a timing of switching of the input signal and a signal one bit after is equalized, and in the third sample hold step, the third multiplication step, the fourth sample hold step, the fourth multiplication step, and the second addition step, a signal at the timing of switching of the input signal and the signal one bit before is equalized.

A computer-readable recording medium of an exemplary aspect of the invention records an equalization program for causing a computer to execute each step of the equalization method.

Effects of the Invention

According to the present invention, an input signal is delayed. The addition means adds the delayed signal, the input signal, and a bit value determination result signal. A bit value represented by the sum signal is determined for each bit, and the determination result signal is fed back to the addition means. This allows the circuit to operate at a high speed while removing the influence of intersymbol interference from the input signal. In the present invention, using feed forward makes it possible to equalize the fastest first post-cursor.

In the present invention, a signal obtained by causing the first sample hold means to hold an input signal and a signal obtained by causing the second sample hold means to hold the input signal are added. It is therefore possible to remove the influence of intersymbol interference from the input signal. In the present invention, it is possible to achieve a faster circuit by equalizing the fastest first post-cursor without using decision-feedback equalization.

In the present invention, a signal obtained by causing the first sample hold means to hold an input signal and a signal obtained by causing the second sample hold means to hold the input signal are added. A signal obtained by causing the third sample hold means to hold the input signal and a signal obtained by causing the fourth sample hold means to hold the input signal are added. It is therefore possible to remove the influence of intersymbol interference from the input signal. In the present invention, it is possible to achieve a faster circuit by equalizing the fastest first post-cursor without using decision-feedback equalization.

BEST MODE FOR CARRYING OUT THE INVENTION

The exemplary embodiments of the present invention will now be described with reference to the accompanying drawings.

First Exemplary Embodiment

Figure 1:
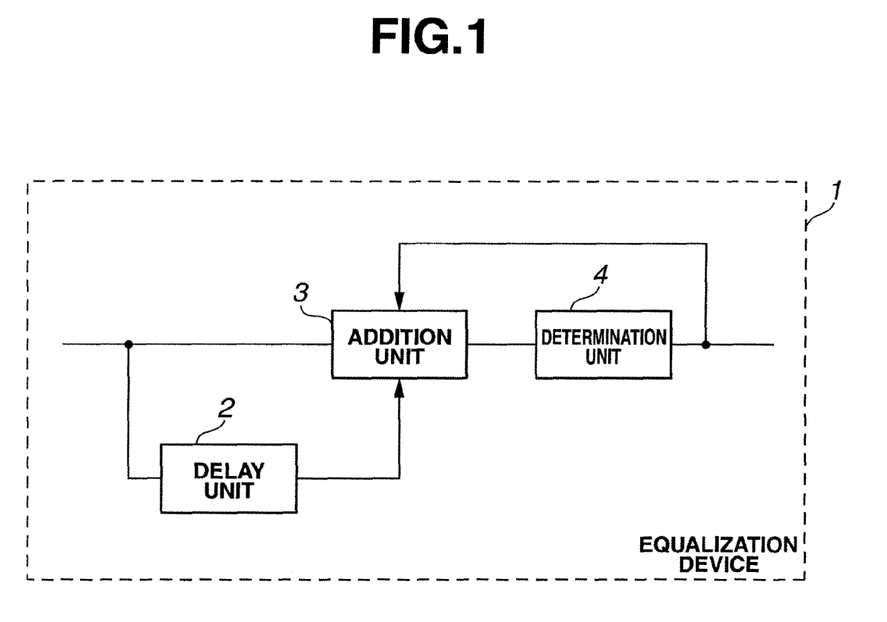
FIG. 1 is a block diagram showing an example of the arrangement of an equalization device according to the first exemplary embodiment of the present invention.

As shown in FIG. 1, an equalization device 1 of this exemplary embodiment includes a delay unit 2, an addition unit 3, and a determination unit 4.

Figure 2:
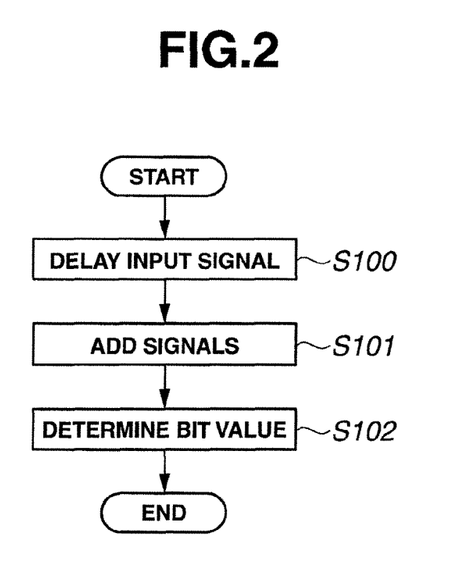
FIG. 2 is a flowchart showing the operation of the equalization device according to the first exemplary embodiment of the present invention.

FIG. 2 is a flowchart showing the operation of the equalization device 1 according to this exemplary embodiment. The delay unit 2 receives a signal transmitted from the transmitting side as the input signal. The delay unit 2 delays the received input signal and outputs the delayed signal to the addition unit 3 (step S100). The delay time of the delay unit 2 corresponds to, for example, one bit of the input signal.

The addition unit 3 receives the signal transmitted from the transmitting side, the signal output from the delay unit 2, and a determination result signal to be described later as the input signals and adds them to generate a sum signal. The addition unit 3 outputs the generated sum signal to the determination unit 4 (step S101).

Based on the waveform of the sum signal output from the addition unit 3, the determination unit 4 determines the bit value ("0" or "1") represented by the sum signal for each bit. At this time, the determination unit 4 performs the determination in accordance with an externally input clock. The determination unit 4 outputs the determination result signal to the addition unit 3 and the succeeding stage (step S102). The determination result signal is a signal having a plurality of bits obtained by concatenating the determination results of the respective bits.

As described above, the equalization device 1 of this exemplary embodiment delays the input signal, adds the delayed signal and the input signal, determines the bit value represented by the input signal in accordance with the clock, feeds back the determination result signal, and adds the feedback signal and the input signal, thereby removing the influence of intersymbol interference. In this exemplary embodiment, it is possible to achieve a faster circuit by equalizing the fastest first post-cursor without using decision-feedback equalization.

In this exemplary embodiment, the equalization device 1 equalizes a single-phase signal. However, the equalization device may include a plurality of arrangements shown in FIG. 1 to equalize an n-phase (n is a natural number) signal.

Second Exemplary Embodiment

Figure 3:
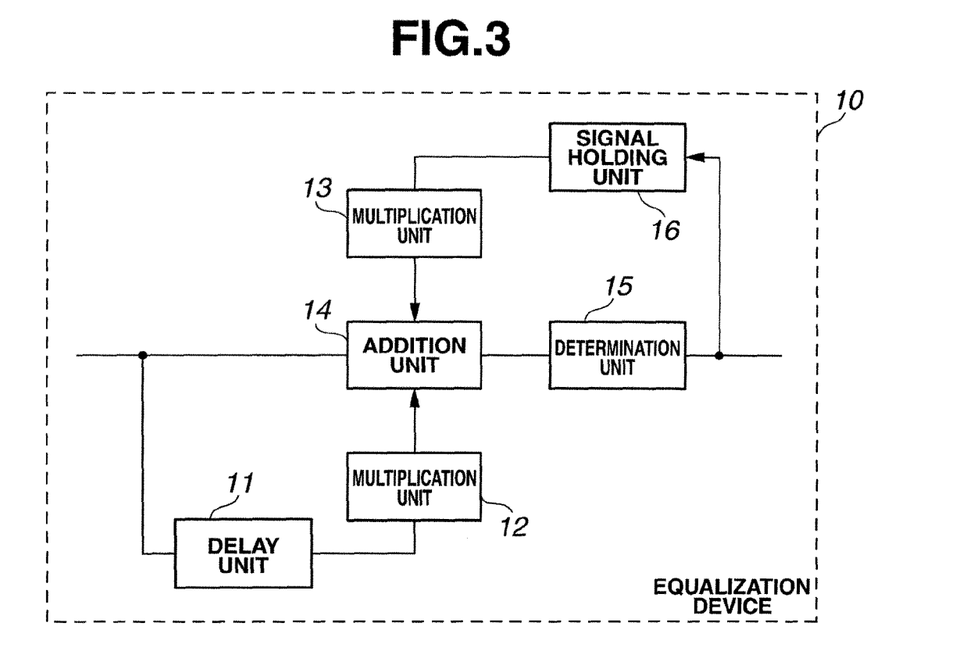
FIG. 3 is a block diagram showing an example of the arrangement of an equalization device according to the second exemplary embodiment of the present invention.

The second exemplary embodiment of the present invention will be described next. In this exemplary embodiment, the first exemplary embodiment will be explained more specifically. As shown in FIG. 3, an equalization device 10 of this exemplary embodiment includes a delay unit 11, multiplication units 12 and 13, an addition unit 14, a determination unit 15, and a signal holding unit 16.

Figure 4:
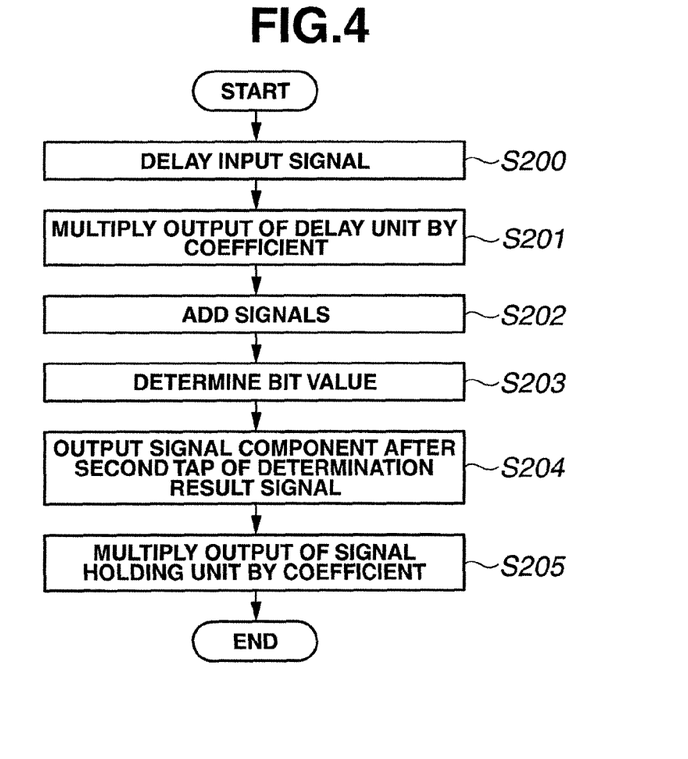
FIG. 4 is a flowchart showing the operation of the equalization device according to the second exemplary embodiment of the present invention.

FIG. 4 is a flowchart showing the operation of the equalization device 10 according to this exemplary embodiment. The delay unit 11 receives a signal transmitted from the transmitting side as the input signal. The delay unit 11 delays the received input signal and outputs the delayed signal to the multiplication unit 12 (step S200). The delay time of the delay unit 11 corresponds to, for example, one bit of the input signal.

The multiplication unit 12 generates a signal by multiplying the signal output from the delay unit 11 by a predetermined coefficient and outputs the generated signal to the addition unit 14 (step S201).

The addition unit 14 receives the signal transmitted from the transmitting side, the signal output from the multiplication unit 12, and the signal output from the multiplication unit 13 as the input signals and adds them to generate a sum signal. The addition unit 14 outputs the generated sum signal to the determination unit 15 (step S202).

Based on the waveform of the sum signal output from the addition unit 14, the determination unit 15 determines the bit value ("0" or "1") represented by the sum signal for each bit. At this time, the determination unit 15 performs the determination in accordance with an externally input clock. The determination unit 15 outputs the determination result signal to the signal holding unit 16 and the succeeding stage (step S203). The determination result signal is a signal having a plurality of bits obtained by concatenating the determination results of the respective bits.

Note that the clock used in the equalization device 10 is phase-locked with the signal transmitted from the transmitting side. Such a clock is output from a CDR (Clock Data Recovery) circuit (not shown) that detects the edge of the signal transmitted from the transmitting side to adjust the phase of the clock.

The signal holding unit 16 holds the determination result signal output from the determination unit 15 and outputs the signal component after the second tap of the determination result signal to the multiplication unit 13 (step S204). Outputting the signal component after the second tap of the determination result signal means outputting the signal component after the second post-cursor with respect to the bit (maim tap) to be determined by the determination unit 15. The signal holding unit 16 holds and outputs such a determination result signal for each clock. Hence, the determination result signal held by the signal holding unit 16 is updated for each clock.

The multiplication unit 13 generates a signal by multiplying the signal output from the signal holding unit 16 by a predetermined coefficient and outputs the generated signal to the addition unit 14 (step S205).

In this exemplary embodiment, the signal delayed by the delay unit 11 is thus fed forward to the addition unit 14, thereby equalizing the first post-cursor component of the input signal transmitted from the transmitting side. The signal component after the second post-cursor determined by the determination unit 15 is fed back to the addition unit 14, thereby equalizing the component after the second post-cursor of the input signal. This allows to remove the influence of intersymbol interference.

As described above, the equalization device 10 of this exemplary embodiment delays the input signal, adds the input signal and the signal obtained by multiplying the delayed signal by the coefficient, determines the bit value represented by the input signal in accordance with the clock, feeds back the determination result signal, and adds the input signal and the signal obtained by multiplying the feedback signal by the coefficient. Hence, in this exemplary embodiment, it is possible to achieve a faster circuit by equalizing the fastest first post-cursor without using decision-feedback equalization.

In this exemplary embodiment, the equalization device 10 equalizes a single-phase signal. However, the equalization device may include a plurality of arrangements shown in FIG. 3 to equalize an n-phase (n is a natural number) signal.

In this exemplary embodiment, the multiplication unit 12 adjusts the magnitude of the signal waveform to be output from the delay unit 11 to the addition unit 14 so as to appropriately equalize the first post-cursor component of the input signal transmitted from the transmitting side. Similarly, the multiplication unit 13 adjusts the magnitude of the signal waveform to be output from the signal holding unit 16 to the addition unit 14 so as to appropriately equalize the component after the second post-cursor of the input signal. Hence, the coefficient to be multiplied by the multiplication unit 12 and the coefficient to be multiplied by the multiplication unit 13 are independently set in advance.

Third Exemplary Embodiment

Figure 5:
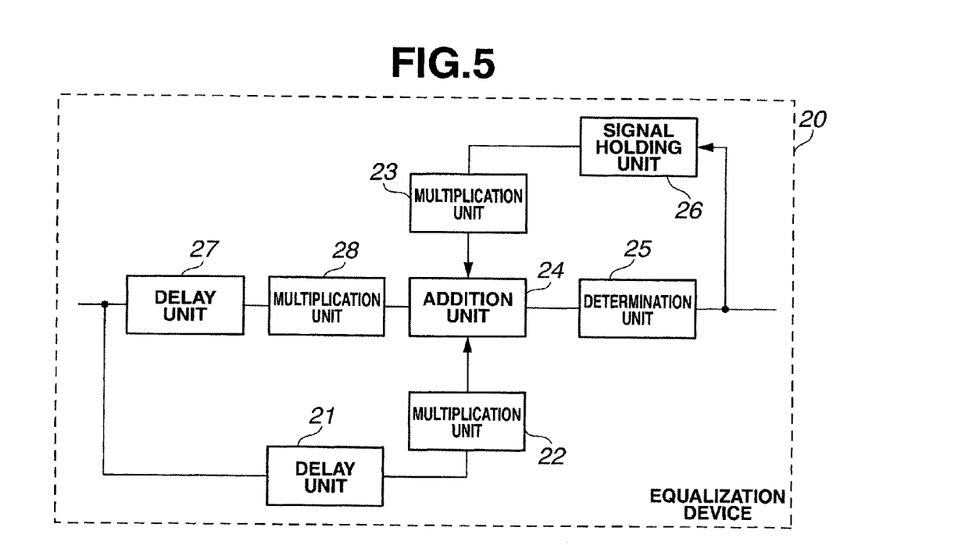
FIG. 5 is a block diagram showing an example of the arrangement of an equalization device according to the third exemplary embodiment of the present invention.

The third exemplary embodiment of the present invention will be described next. As shown in FIG. 5, an equalization device 20 of this exemplary embodiment includes delay units 21 and 27, multiplication units 22, 23, and 28, an addition unit 24, a determination unit 25, and a signal holding unit 26.

Figure 6:
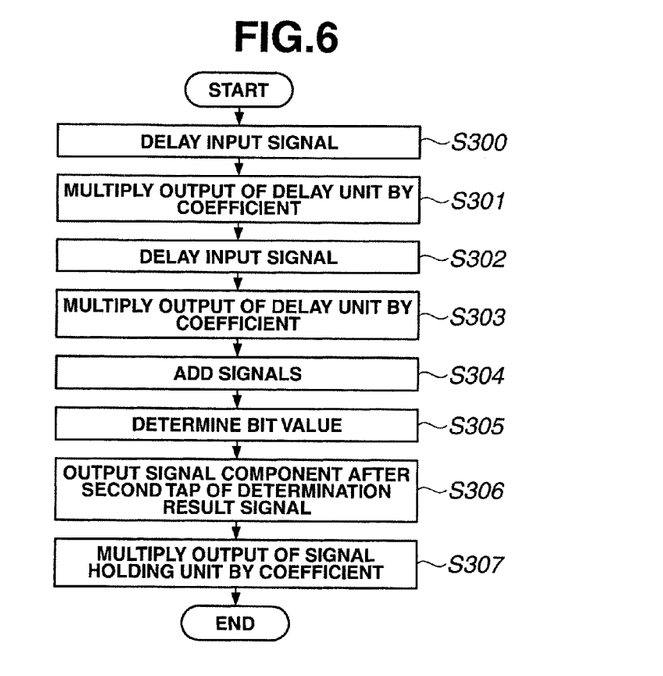
FIG. 6 is a flowchart showing the operation of the equalization device according to the third exemplary embodiment of the present invention.

FIG. 6 is a flowchart showing the operation of the equalization device 20 according to this exemplary embodiment. The delay unit 21 receives a signal transmitted from the transmitting side as the input signal. The delay unit 21 delays the received input signal and outputs the delayed signal to the multiplication unit 22 (step S300). The delay time of the delay unit 21 equals the sum of the delay time of the delay unit 27 and, for example, a time corresponding to one bit of the input signal. In this exemplary embodiment, the delay time corresponds to, for example, two bits.

The multiplication unit 22 generates a signal by multiplying the signal output from the delay unit 21 by a predetermined coefficient and outputs the generated signal to the addition unit 24 (step S301).

The delay unit 27 receives the signal transmitted from the transmitting side as the input signal. The delay unit 27 delays the received input signal and outputs the delayed signal to the multiplication unit 28 (step S302). The delay time of the delay unit 27 corresponds to, for example, one bit of the input signal.

The multiplication unit 28 generates a signal by multiplying the signal output from the delay unit 27 by a predetermined coefficient and outputs the generated signal to the addition unit 24 (step S303).

The addition unit 24 receives the signal output from the multiplication unit 28, the signal output from the multiplication unit 22, and the signal output from the multiplication unit 23 as the input signals and adds them to generate a sum signal. The addition unit 24 outputs the generated sum signal to the determination unit 25 (step S304).

Based on the waveform of the sum signal output after the addition unit 24, the determination unit 25 determines the bit value represented by the sum signal for each bit. At this time, the determination unit 25 performs the determination in accordance with an externally input clock, like the determination unit 15 of the second exemplary embodiment. The determination unit 25 outputs the determination result signal to the signal holding unit 26 and the succeeding stage (step S305).

The signal holding unit 26 holds the determination result signal output from the determination unit 25 and outputs the signal component after the second tap of the determination result signal to the multiplication unit 23 (step S306).

The multiplication unit 23 generates a signal by multiplying the signal output from the signal holding unit 26 by a predetermined coefficient and outputs the generated signal to the addition unit 24 (step S307).

In this exemplary embodiment, the signal delayed by the delay unit 21 is thus fed forward to the addition unit 24, thereby equalizing the first post-cursor component of the input signal transmitted from the transmitting side. The signal component after the second post-cursor determined by the determination unit 25 is fed back to the addition unit 24, thereby equalizing the component after the second post-cursor of the input signal. This allows to remove the influence of intersymbol interference.

In this exemplary embodiment, the delay unit 27 and the multiplication unit 28 are added to the same arrangement as that of the second exemplary embodiment. In this exemplary embodiment, the delay unit 27 can perform waveform shaping of the input signal transmitted from the transmitting side. This facilitates determination of the determination unit 25.

In this exemplary embodiment, the equalization device 20 equalizes a single-phase signal. However, the equalization device may include a plurality of arrangements shown in FIG. 5 to equalize an n-phase (n is a natural number) signal.

Fourth Exemplary Embodiment

Figure 7:
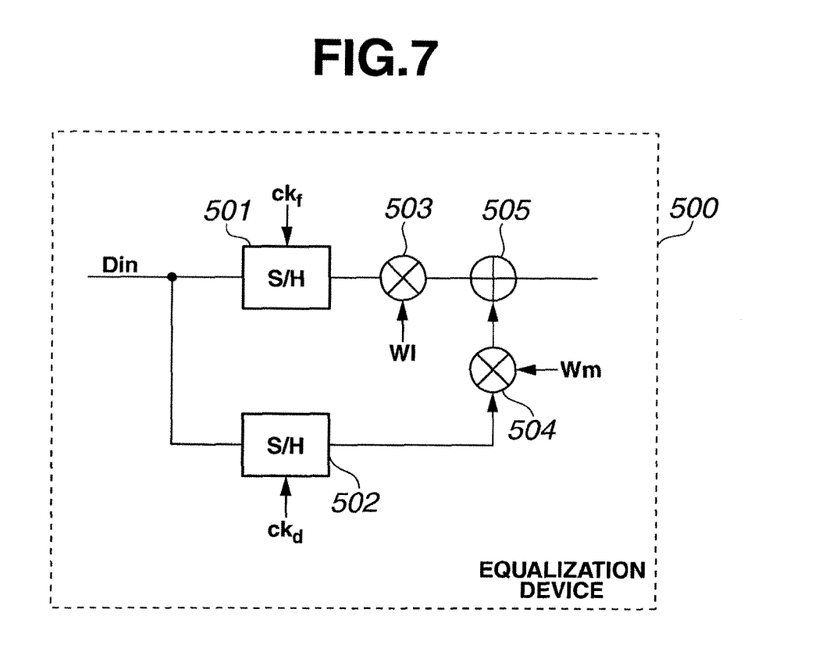
FIG. 7 is a block diagram showing an example of the arrangement of an equalization device according to the fourth exemplary embodiment of the present invention.

The fourth exemplary embodiment of the present invention will be described next. As shown in FIG. 7, an equalization device 500 of this exemplary embodiment includes sample hold units 501 and 502, multiplication units 503 and 504, and an addition unit 505. This exemplary embodiment corresponds to the third exemplary embodiment in which the sample hold unit 502 is used as the delay unit 21, and the sample hold unit 501 is used as the delay unit 27.

Figure 8:
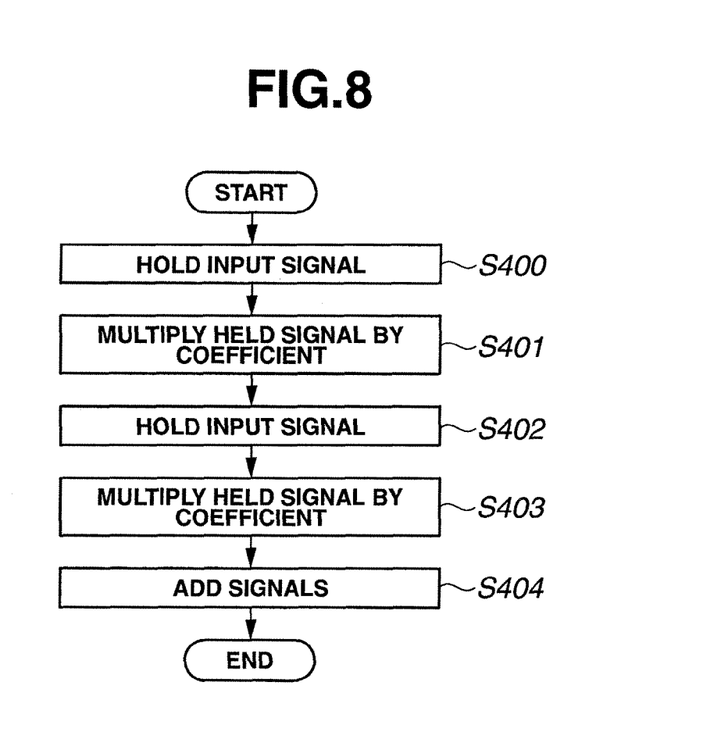
FIG. 8 is a flowchart showing the operation of the equalization device according to the fourth exemplary embodiment of the present invention.

FIG. 8 is a flowchart showing the operation of the equalization device 500 according to this exemplary embodiment. The sample hold unit 501 receives a signal Din transmitted from the transmitting side as the input signal. The sample hold unit 501 holds the received input signal D in at the timing of the leading edge of a clock ckf and outputs the held signal to the multiplication unit 503 (step S400).

The multiplication unit 503 multiplies the signal output from the sample hold unit 501 by a coefficient W1 and outputs the signal to the addition unit 505 (step S401). The coefficient W1 will be described later.

The sample hold unit 502 receives the signal D in transmitted from the transmitting side as the input signal. The sample hold unit 502 holds the received input signal D in at the timing of the leading edge of a clock ckd and outputs the held signal to the multiplication unit 504 (step S402).

The multiplication unit 504 multiplies the signal output from the sample hold unit 502 by a coefficient Wm and outputs the signal to the addition unit 505 (step S403).

The coefficients Wm and W1 will be described here. The coefficients Wm and W1 are determined such that the first post-cursor is removed when the signals output from the multiplication units 503 and 504 are added by the addition unit 505. FIG. 15 shows an example of the input signal to the equalization device when a single bit is transmitted. $C_1$ is obtained at the sampling timing one symbol length after the sampling timing of $C_0$, where the signal strength should be zero. This amount is the amount of intersymbol interference of the first post-cursor tap. The values of the coefficients Wm and W1 are determined such that the strength of the intersymbol interference becomes zero.

The addition unit 505 receives the signal output from the multiplication unit 503 and the signal output from the multiplication unit 504 as the input signals and adds them to generate a sum signal. The addition unit 505 outputs the generated sum signal to the circuit of the succeeding stage (step S404).

The multiplication unit 503 preferably outputs an input signal just one symbol length before the output of the multiplication unit 504. However, depending on the clock rate, it may be impossible to continuously hold data by one sample hold during the period of one symbol length. Hence, a plurality of sample hold units 501 may be provided in series to repetitively sample and hold the input signal so as to hold data during the period of one symbol length or more. One symbol length represents the time per symbol.

As described above, in this exemplary embodiment, the equalization device 500 holds the input signal at the timing of the clock ckf and adds the held signal and a signal obtained by holding the input signal at the timing of the clock ckd. Since the same voltage as the voltage of intersymbol interference is applied, the influence of intersymbol interference can be removed. In this exemplary embodiment, it is possible to achieve a faster circuit by equalizing the fastest first post-cursor without using decision-feedback equalization.

Figure 9:
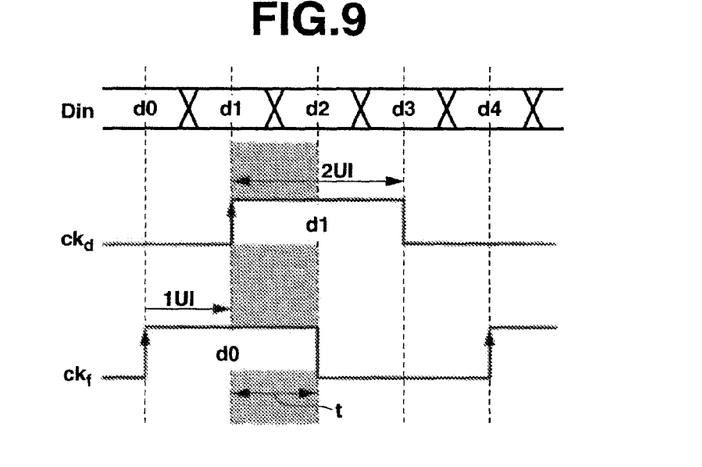
FIG. 9 is a timing chart showing an example of the operation of the equalization device according to the fourth exemplary embodiment of the present invention.

FIG. 9 is a timing chart showing only one phase when equalizing a four-phase signal. The operation of this exemplary embodiment will be described with reference to FIG. 9. UI (unit interval) in FIG. 9 means the symbol length. In addition, t in FIG. 9 represents the equalization period.

First, the clock ckf is input to the sample hold unit 501, and the clock ckd is input to the sample hold unit 502. The sample hold units 501 and 502 hold the signal Din during the period of two symbol lengths at the timings of the leading edges of the clocks ckf and ckd, respectively. The clocks ckf and ckd are shifted by one symbol length. For this reason, when the sample hold unit 502 outputs the signal to the multiplication unit 504, the sample hold unit 501 simultaneously outputs the signal shifted by one symbol length to the multiplication unit 503.

The four-phase clock enables to hold data during the period of two symbol lengths. Hence, the addition unit 505 adds the output signal of the multiplication unit 503 and that of the multiplication unit 504 during the equalization period t where the signals overlap by one symbol length, thereby equalizing the first post-cursor of the input signal.

In this exemplary embodiment, the equalization device 500 equalizes a single-phase signal. However, the equalization device may include n arrangements shown in FIG. 7 to equalize an n-phase signal.

Fifth Exemplary Embodiment

Figure 10:
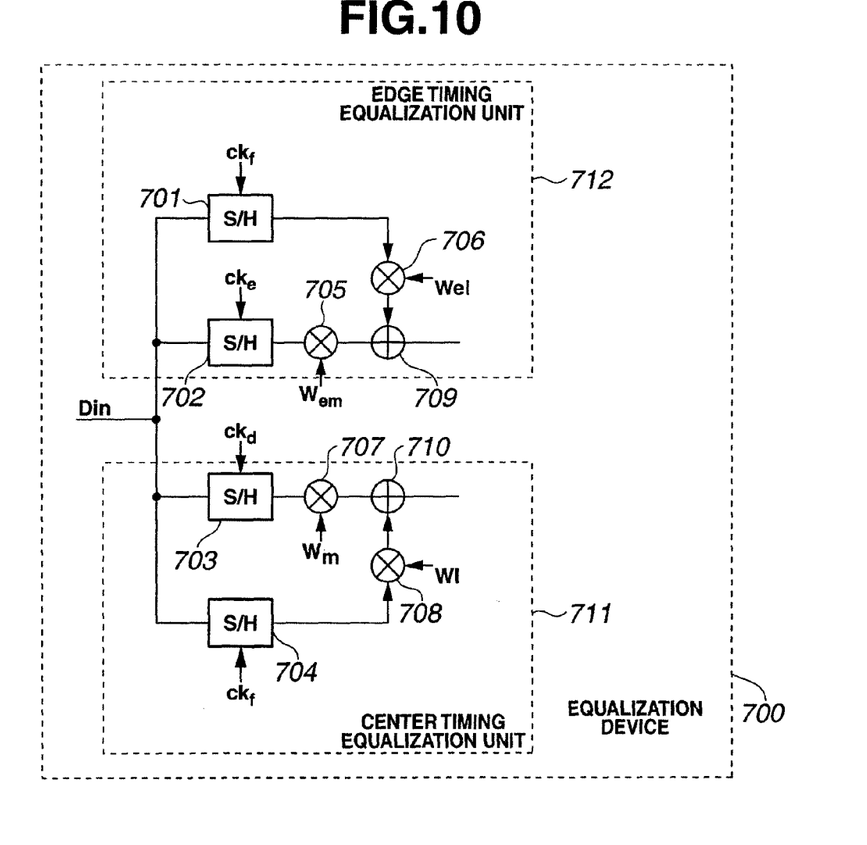
FIG. 10 is a block diagram showing an example of the arrangement of an equalization device according to the fifth exemplary embodiment of the present invention.

The fifth exemplary embodiment of the present invention will be described next. As shown in FIG. 10, an equalization device 700 of this exemplary embodiment includes a center timing equalization unit 711 and an edge timing equalization unit 712. The center timing equalization unit 711 includes sample hold units 703 and 704, multiplication units 707 and 708, and an addition unit 710. The edge timing equalization unit 712 includes sample hold units 701 and 702, multiplication units 705 and 706, and an addition unit 709.

Each of the center timing equalization unit 711 and the edge timing equalization unit 712 has the same arrangement as that of the equalization device 500 of the fourth exemplary embodiment. The center timing equalization unit 711 equalizes the signal between the timing of switching of the input signal and the signal one bit before and the timing of switching of the input signal and the signal one bit after. The edge timing equalization unit 712 equalizes the signal at the timing of switching of the input signal and the signal one bit before.

Figure 11:
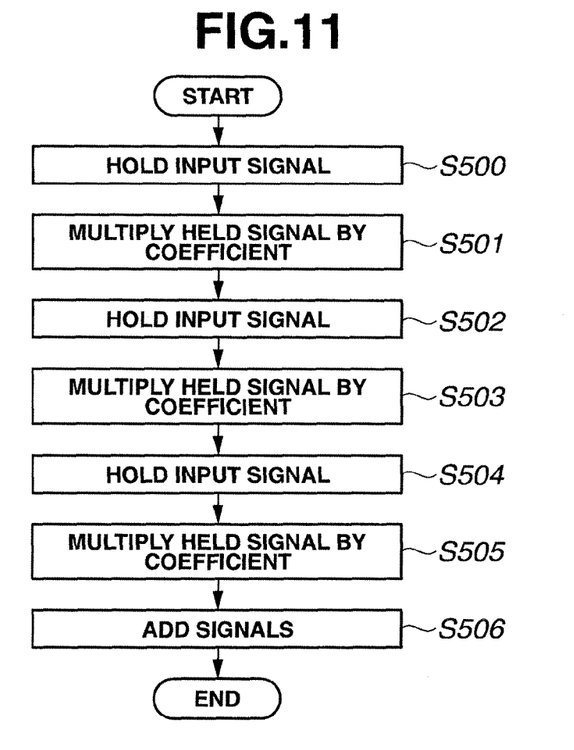
FIG. 11 is a flowchart showing the operation of the equalization device according to the fifth exemplary embodiment of the present invention.

FIG. 11 is a flowchart showing the operation of the equalization device 700 according to this exemplary embodiment. The sample hold units 701 and 704 receive a signal Din transmitted from the transmitting side as the input signal. The sample hold units 701 and 704 hold the received input signal Din at the timing of the leading edge of a clock ckf and output the held signal to the multiplication units 706 and 708 (step S500).

The multiplication units 706 and 708 multiply the signals output from the sample hold units 701 and 704 by coefficients Wel and W1 and output the generated signals to the addition units 709 and 710, respectively (step S501).

The sample hold unit 702 receives the signal Din transmitted from the transmitting side as the input signal. The sample hold unit 702 holds the received input signal D in at the timing of the leading edge of a clock cke and outputs the held signal to the multiplication unit 705 (step S502). The multiplication unit 705 multiplies the signal output from the sample hold unit 702 by a coefficient Wem and outputs the generated signal to the addition unit 709 (step S503).

The sample hold unit 703 receives the signal Din transmitted from the transmitting side as the input signal. The sample hold unit 703 holds the received input signal Din at the timing of the leading edge of a clock ckd and outputs the held signal to the multiplication unit 707 (step S504). The multiplication unit 707 multiplies the signal output from the sample hold unit 703 by a coefficient Wm and outputs the generated signal to the addition unit 710 (step S505).

The addition unit 709 receives the signal output from the multiplication unit 705 and the signal output from the multiplication unit 706 as the input signals and adds them to generate a sum signal. The addition unit 709 outputs the generated sum signal to the circuit of the succeeding stage (step S506). Similarly, the addition unit 710 receives the signal output from the multiplication unit 707 and the signal output from the multiplication unit 708 as the input signals and adds them to generate a sum signal. The addition unit 710 outputs the generated sum signal to the circuit of the succeeding stage (step S506).

The coefficients Wm and W1 are determined such that the first post-cursor becomes zero when the signals output from the multiplication units 707 and 708 are added by the addition unit 710, as in the fourth exemplary embodiment. The coefficients Wem and Wel are determined such that the amount of intersymbol interference of the a 0.5th post-cursor tap at the timing a 0.5 symbol length after the timing of $C_0$ becomes zero when the signals output from the multiplication units 705 and 706 are added by the addition unit 709.

Each of the multiplication units 706 and 708 preferably outputs an input signal just one symbol length before the output of the multiplication unit 707. The multiplication unit 705 preferably outputs an input signal just a 0.5 symbol length before the output of the multiplication unit 707. However, depending on the clock rate, it may be impossible to continuously hold data by one sample hold during the period of one symbol length or a 0.5 symbol length. Hence, a plurality of sample hold units 701 may be provided in series to repetitively sample and hold the input signal so as to hold data during the period of one symbol length or more.

Similarly, a plurality of sample hold units 704 may be provided in series to repetitively sample and hold the input signal so as to hold data during the period of one symbol length or more. In addition, a plurality of sample hold units 702 may be provided in series to repetitively sample and hold the input signal so as to hold data during the period of a 0.5 symbol length or more.

Figure 12:
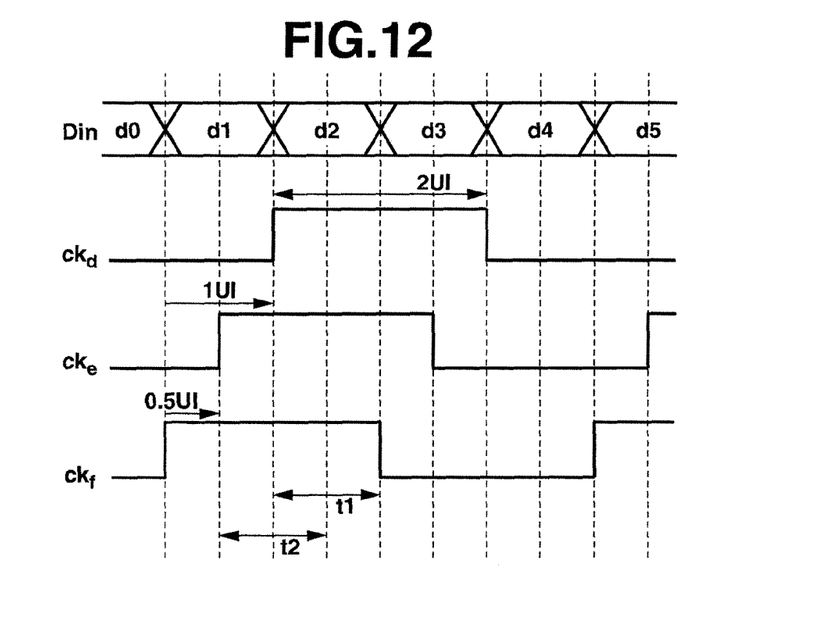
FIG. 12 is a timing chart showing an example of the operation of the equalization device according to the fifth exemplary embodiment of the present invention.

The operation of this exemplary embodiment will be described with reference to FIG. 12. The clock cke and the clock ckf are shifted by a 0.5 symbol length. The clock ckd and the clock ckf are shifted by one symbol length. For this reason, when the sample hold unit 703 outputs the signal to the multiplication unit 707, the sample hold unit 702 outputs the signal shifted by a 0.5 symbol length to the multiplication unit 705, and the sample hold units 701 and 704 output the signals shifted by one symbol length to the multiplication units 706 and 708 simultaneously.

In the center timing equalization unit 711, the addition unit 710 adds the output signal of the multiplication unit 707 and that of the multiplication unit 708 during an equalization period t1, thereby equalizing the first post-cursor of the input signal. In the edge timing equalization unit 712, the addition unit 709 adds the output signal of the multiplication unit 705 and that of the multiplication unit 706 during an equalization period t2, thereby equalizing the first post-cursor of the input signal.

In this exemplary embodiment, the equalization device 700 equalizes a single-phase signal. However, the equalization device may include n arrangements shown in FIG. 10 to equalize an n-phase signal.

Sixth Exemplary Embodiment

Figure 13:
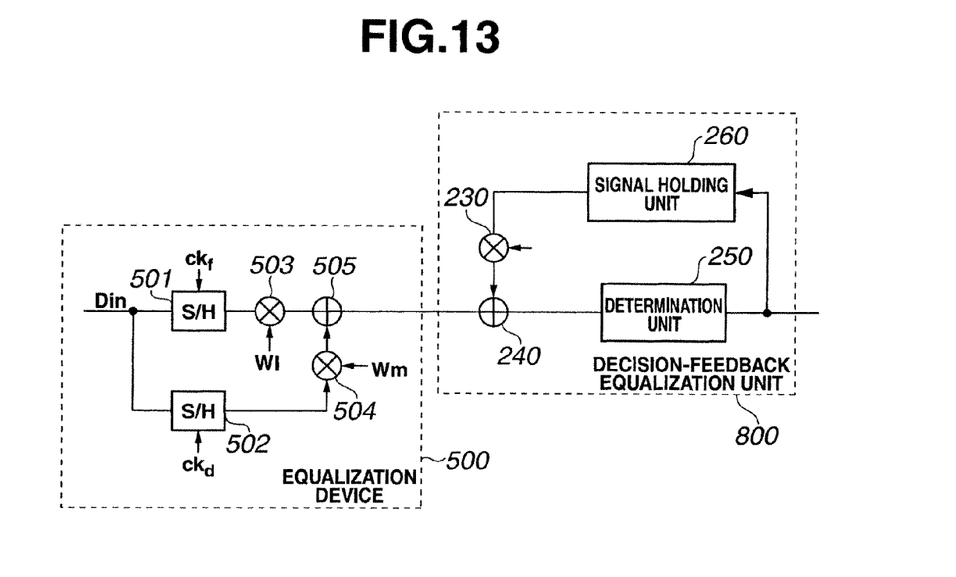
FIG. 13 is a block diagram showing an example of the arrangement of an equalization device according to the sixth exemplary embodiment of the present invention.

The sixth exemplary embodiment of the present invention will be described next. In this exemplary embodiment, a decision-feedback equalization unit 800 is combined with the succeeding stage of an equalization device 500 of the fourth exemplary embodiment, as shown in FIG. 13. Since the equalization device 500 of the preceding stage removes the first post-cursor, the decision-feedback equalization unit 800 equalizes the component after the second post-cursor.

The decision-feedback equalization unit 800 includes a multiplication unit 230, an addition unit 240, a determination unit 250, and a signal holding unit 260. The addition unit 240 receives the signal output from the equalization device 500 and the signal output from the multiplication unit 230 as the input signals and adds them to generate a sum signal. Based on the waveform of the sum signal output from the addition unit 240, the determination unit 250 determines the bit value represented by the sum signal for each bit. The signal holding unit 260 holds the determination result signal output from the determination unit 250. The multiplication unit 230 generates a signal by multiplying the signal output from the signal holding unit 260 by a predetermined coefficient and outputs the generated signal to the addition unit 240.

The decision-feedback equalization unit 800 can have a general circuit arrangement. The decision-feedback equalization unit 800 is disclosed in, for example, non-patent literature 1, and a detailed description thereof will be omitted.

In this exemplary embodiment, an input signal Din is held, and the held signal is fed forward to the addition unit 505, thereby equalizing the first post-cursor, as in the fourth exemplary embodiment. The decision-feedback equalization unit 800 can equalize the component after the second post-cursor. This allows to remove the influence of intersymbol interference. Hence, in this exemplary embodiment, it is possible to achieve a faster circuit.

The equalization device of this exemplary embodiment equalizes a single-phase signal. However, the equalization device may include n arrangements shown in FIG. 13 to equalize an n-phase signal.

The decision-feedback equalization unit 800 shown in FIG. 13 has a one-phase configuration but may have a multi-phase configuration. An example of a circuit arrangement for a two-phase configuration is disclosed in, for example, non-patent literature 1. A circuit arrangement for four or more phases can be implemented like the circuit arrangement disclosed in non-patent literature 1.

Seventh Exemplary Embodiment

Figure 14:
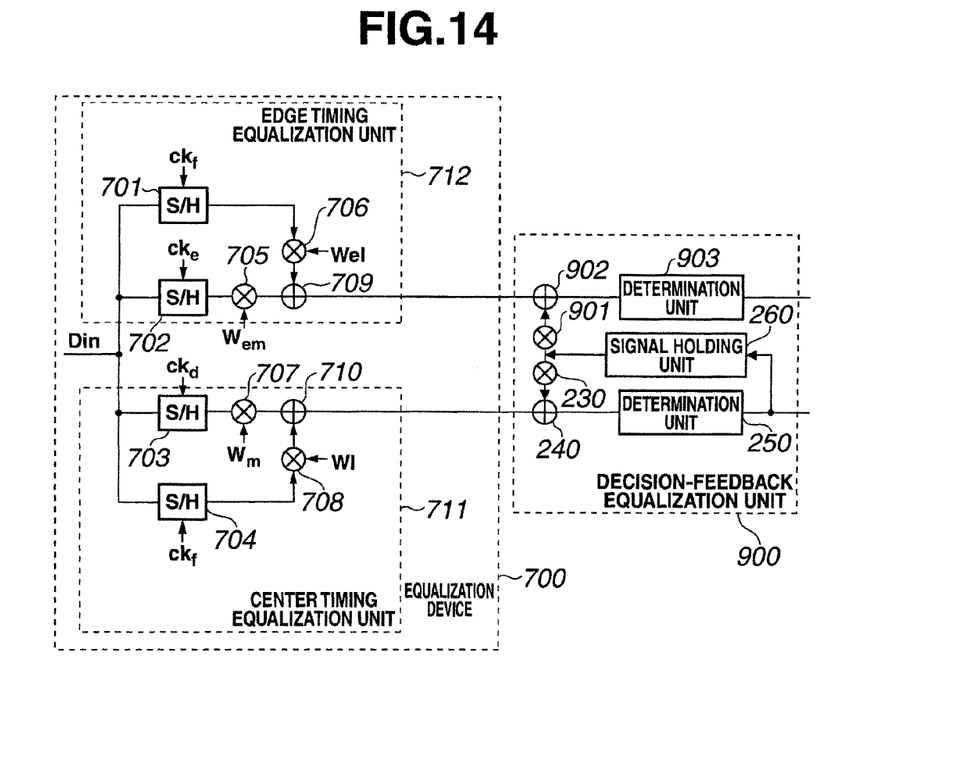
FIG. 14 is a block diagram showing an example of the arrangement of an equalization device according to the seventh exemplary embodiment of the present invention.

The seventh exemplary embodiment of the present invention will be described next. In this exemplary embodiment, a decision-feedback equalization unit 900 is combined with the succeeding stage of an equalization device 700 of the fifth exemplary embodiment, as shown in FIG. 14. Since the equalization device 700 of the preceding stage removes the intersymbol interference amount of the first post-cursor and the 0.5th post-cursor, the decision-feedback equalization unit 900 equalizes the component after the 1.5th post-cursor.

The decision-feedback equalization unit 900 includes multiplication units 230 and 901, addition units 240 and 902, determination units 250 and 903, and a signal holding unit 260. The multiplication unit 901 generates a signal by multiplying the signal output from the signal holding unit 260 by a predetermined coefficient and outputs the generated signal to the addition unit 902. The addition unit 902 receives the signal output from an edge timing equalization unit 712 of the equalization device 700 and the signal output from the multiplication unit 901 as the input signals and adds them to generate a sum signal. Based on the waveform of the sum signal output from the addition unit 902, the determination unit 903 determines the bit value represented by the sum signal for each bit.

In this exemplary embodiment, an input signal Din is held, and the held signal is fed forward to addition units 709 and 710, thereby equalizing the 0.5th post-cursor and the first post-cursor, as in the fifth exemplary embodiment. The decision-feedback equalization unit 900 can equalize the component after the 1.5th post-cursor. This allows to remove the influence of intersymbol interference of both the data and the edge at the same timing. Hence, in this exemplary embodiment, it is possible to achieve a faster circuit.

The equalization device of this exemplary embodiment equalizes a single-phase signal. However, the equalization device may include n arrangements shown in FIG. 14 to equalize an n-phase signal.

In the above-described first to seventh exemplary embodiments, processing in the equalization device is not necessarily implemented by dedicated hardware but may also be executed by a computer. In this case, the equalization device can be implemented by a computer including a CPU, a storage device, and an interface, and a program for controlling these hardware resources. In such a computer, the equalization program for implementing the equalization method of the present invention is provided while being recorded on a recording medium such as a flexible disk, a magnetooptical disk, a DVD, or a CD. The CPU writes, in the storage device, the program read out from the recording medium, and executes the processing described in the first to seventh exemplary embodiments in accordance with the program.

Some or all of the above-described exemplary embodiments can also be described as in the following additions but are not limited to the followings.

(Supplementary Note 1)

An equalization device comprises first sample hold means for sampling and holding an input signal modulated at a period of a predetermined symbol length, first multiplication means for multiplying an output signal of the first sample hold means by a first coefficient, second sample hold means for sampling and holding the input signal at a timing delayed from a sample hold timing of the first sample hold means by one symbol length of the input signal, second multiplication means for multiplying an output signal of the second sample hold means by a second coefficient, and addition means for adding an output signal of the first multiplication means and an output signal of the second multiplication means to output a sum signal.

(Supplementary Note 2)

An equalization device according to supplementary note 1 further comprises decision-feedback equalization means for receiving the sum signal as an input and removing a component after a second post-cursor of the sum signal.

(Supplementary Note 3)

An equalization device comprises first sample hold means for sampling and holding an input signal modulated at a period of a predetermined symbol length, first multiplication means for multiplying an output signal of the first sample hold means by a first coefficient, second sample hold means for sampling and holding the input signal at a timing delayed from a sample hold timing of the first sample hold means by one symbol length of the input signal, second multiplication means for multiplying an output signal of the second sample hold means by a second coefficient, first addition means for adding an output signal of the first multiplication means and an output signal of the second multiplication means to output a first sum signal, third sample hold means for sampling and holding the input signal at the same timing as the sample hold timing of the first sample hold means, third multiplication means for multiplying an output signal of the third sample hold means by a third coefficient, fourth sample hold means for sampling and holding the input signal at a timing delayed from a sample hold timing of the third sample hold means by a 0.5 symbol length of the input signal, fourth multiplication means for multiplying an output signal of the fourth sample hold means by a fourth coefficient, and second addition means for adding an output signal of the third multiplication means and an output signal of the fourth multiplication means to output a second sum signal, wherein the first sample hold means, the first multiplication means, the second sample hold means, the second multiplication means, and the first addition means equalize a signal between a timing of switching of the input signal and a signal one bit before and a timing of switching of the input signal and a signal one bit after, and the third sample hold means, the third multiplication means, the fourth sample hold means, the fourth multiplication means, and the second addition means equalize a signal at the timing of switching of the input signal and the signal one bit before.

(Supplementary Note 4)

An equalization device according to supplementary note 3 further comprises decision-feedback equalization means for receiving the first sum signal and the second sum signal as inputs and removing a component after a 1.5th post-cursor of each of the first sum signal and the second sum signal.

(Supplementary Note 5)

An equalization device comprises first delay means for delaying an input signal, addition means for adding the input signal, a signal output from the first delay means, and a bit value determination result signal to generate a sum signal, and determination means for determining a bit value represented by the sum signal for each bit and feeding back the determination result signal to the addition means.

(Supplementary Note 6)

An equalization device according to supplementary note 5 further comprises signal holding means, provided between the determination means and the addition means, for holding the determination result signal output from the determination means and outputting a signal component after a second tap of the determination result signal to the addition means, wherein the first delay means delays the input signal by one bit.

(Supplementary Note 7)

An equalization device according to supplementary note 6 further comprises first multiplication means, provided between the first delay means and the addition means, for outputting a signal obtained by multiplying the signal output from the first delay means by a first coefficient to the addition means, and second multiplication means, provided between the signal holding means and the addition means, for outputting a signal obtained by multiplying a signal output from the signal holding means by a second coefficient to the addition means.

(Supplementary Note 8)

An equalization device according to any one of supplementary notes 5 to 7 further comprises second delay means, provided at a preceding stage of the addition means, for delaying the input signal and outputting the input signal to the addition means.

(Supplementary Note 9)

An equalization method comprises the first sample hold step of sampling and holding an input signal modulated at a period of a predetermined symbol length, the first multiplication step of multiplying an output signal obtained in the first sample hold step by a first coefficient, the second sample hold step of sampling and holding the input signal at a timing delayed from a sample hold timing of the first sample hold step by one symbol length of the input signal, the second multiplication step of multiplying an output signal obtained in the second sample hold step by a second coefficient, and the addition step of adding an output signal obtained in the first multiplication step and an output signal obtained in the second multiplication step to output a sum signal.

(Supplementary Note 10)

An equalization method according to supplementary note 9 further comprises the decision-feedback equalization step of receiving the sum signal as an input and removing a component after a second post-cursor of the sum signal.

(Supplementary Note 11)

An equalization method comprises the first sample hold step of sampling and holding an input signal modulated at a period of a predetermined symbol length, the first multiplication step of multiplying an output signal obtained in the first sample hold step by a first coefficient, the second sample hold step of sampling and holding the input signal at a timing delayed from a sample hold timing of the first sample hold step by one symbol length of the input signal, the second multiplication step of multiplying an output signal obtained in the second sample hold step by a second coefficient, the first addition step of adding an output signal obtained in the first multiplication step and an output signal obtained in the second multiplication step to output a first sum signal, the third sample hold step of sampling and holding the input signal at the same timing as the sample hold timing of the first sample hold step, the third multiplication step of multiplying an output signal obtained in the third sample hold step by a third coefficient, the fourth sample hold step of sampling and holding the input signal at a timing delayed from a sample hold timing of the third sample hold step by a 0.5 symbol length of the input signal, the fourth multiplication step of multiplying an output signal obtained in the fourth sample hold step by a fourth coefficient, and the second addition step of adding an output signal obtained in the third multiplication step and an output signal obtained in the fourth multiplication step to output a second sum signal, wherein in the first sample hold step, the first multiplication step, the second sample hold step, the second multiplication step, and the first addition step, a signal between a timing of switching of the input signal and a signal one bit before and a timing of switching of the input signal and a signal one bit after is equalized, and in the third sample hold step, the third multiplication step, the fourth sample hold step, the fourth multiplication step, and the second addition step, a signal at the timing of switching of the input signal and the signal one bit before is equalized.

(Supplementary Note 12)

An equalization method according to supplementary note 11 further comprises the decision-feedback equalization step of receiving the first sum signal and the second sum signal as inputs and removing a component after a second post-cursor of each of the first sum signal and the second sum signal.

(Supplementary Note 13)

An equalization method comprises the first delay step of delaying an input signal, the addition step of adding the input signal, a signal delayed in the first delay step, and a bit value determination result signal to generate a sum signal, and the determination step of determining a bit value represented by the sum signal for each bit and feeding back the determination result signal to the addition step.

(Supplementary Note 14)

An equalization method according to supplementary note 13 further comprises the signal holding step of holding the determination result signal obtained in the determination step and feeding back a signal component after a second tap of the determination result signal to the addition step, wherein in the first delay step, the input signal is delayed by one bit.

(Supplementary Note 15)

An equalization method according to supplementary note 14 further comprises, between the first delay step and the addition step, the first multiplication step of multiplying the signal delayed in the first delay step by a first coefficient, and between the signal holding step and the addition step, the second multiplication step of multiplying the signal component after the second tap by a second coefficient.

(Supplementary Note 16)

An equalization method according to any one of supplementary notes 13 to 15 further comprises, before the addition step, the second delay step of delaying the input signal.

(Supplementary Note 17)

A computer-readable recording medium records an equalization program for causing a computer to execute each step of any one of supplementary notes 9 to 16.

The present invention has been described above with reference to the exemplary embodiments. However, the present invention is not limited to the above-described exemplary embodiments. The above-described exemplary embodiments can be combined as needed, and changes and modifications can be made as needed for the arrangement and details of the present invention within the scope of the appended claims of the present invention.

This application is based upon and claims the benefit of priority from Japanese Patent Application No. 2009-210998, filed on Sep. 11, 2009, the disclosure of which is incorporated herein in its entirety by reference.

INDUSTRIAL APPLICABILITY

The present invention is applicable to a technique of equalizing degradation in the waveform of an input signal.

The invention claimed is:

1. An equalization device comprising:
a first sample hold unit that samples and holds an input signal modulated at a period of a predetermined symbol length;
a first multiplication unit that multiplies an output signal of said first sample hold unit by a first coefficient;
a second sample hold unit that samples and holds the input signal at a timing delayed from a sample hold timing of said first sample hold unit by one symbol length of the input signal;
a second multiplication unit that multiples an output signal of said second sample hold unit by a second coefficient; and
an addition unit that adds an output signal of said first multiplication unit and an output signal of said second multiplication unit to output a sum signal,
wherein the first coefficient and the second coefficient are determined such that a first post-cursor is removed from the output signal of said first multiplication unit when the output signal of said multiplication unit and the output signal from said second multiplication unit are added by said addition unit.

2. An equalization device according to claim 1, further comprising a decision-feedback equalization unit that receives the sum signal as an input and removes a component after a second post-cursor of the sum signal.

3. The equalization device according to claim 1, wherein said first coefficient and said second coefficient are determined such that a strength of an intersymbol interference becomes zero.

* * * * *